Figure 1:
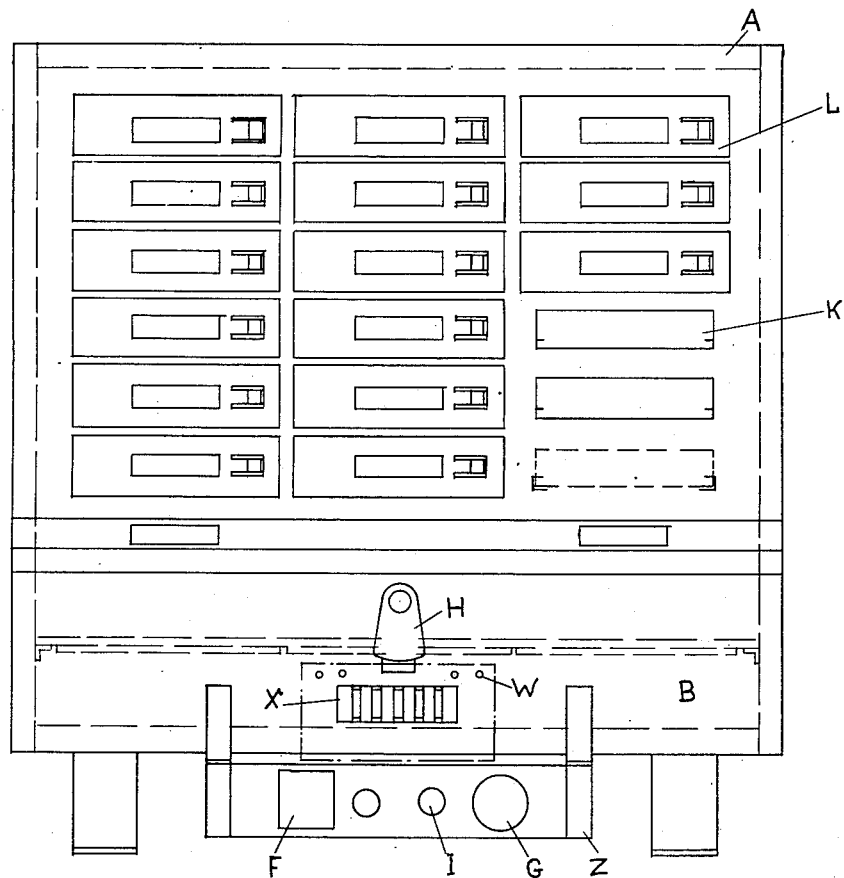

April 15, 1941.　　A. P. SUMMERFIELD　　2,238,378
APPARATUS FOR PREHEATING MOLDABLE, THERMOSETTING COMPOSITIONS
Filed March 15, 1940　　2 Sheets-Sheet 1

Inventor
Arthur Percy Summerfield
by Denso Sleinhers
attorney

Patented Apr. 15, 1941

2,238,378

UNITED STATES PATENT OFFICE 2,238,378

APPARATUS FOR PREHEATING MOLDABLE, THERMOSETTING COMPOSITIONS

Arthur Percy Summerfield, Birmingham, England

Application March 15, 1940, Serial No. 324,070
In Great Britain January 16, 1939

5 Claims. (Cl. 219—35)

This invention relates to a method and apparatus for preheating moldable, thermosetting compositions, and it has particular relation to the preheating of moldable compositions which contain heat-hardenable artificial resins, for example those of the phenol-aldehyde class, urea-aldehyde class or other heat-hardenable resins, as a binder.

Preheating of thermosetting molding materials results in a reduction of the closing and curing time and of the wear on the molds, as well as in an improvement in the appearance and the mechanical and insulating properties of the moldings. Hitherto the preheating process for thermosetting compositions has been used only to a limited extent. This is due to the fact that the preheating ovens hitherto used have not responded to the requirements of the preheating process of thermosetting molding powders.

The result of the preheating depends upon the dual influence of the temperature and the time for which the molding composition is left in the oven. If the temperature is too high and the time of preheating is too long, the composition begins to loose its lubricants or to harden, the result of which is a stiff flow and porous moldings with thick flash.

In many molding plants where steam is used as a heating medium for the molds at temperatures of 140°–180° C., the return steam, a mixture of steam and condensate, is often used for the preheating ovens, giving a temperature of about 100° C. Some of the thermosetting molding compositions, such as those containing phenol-formaldehyde resin binders, begin to lose their fluidity after an exposure to temperatures above 90° C. while for powders containing urea-formaldehyde resin binders, the limiting temperature is about 80° C. If the composition is placed in a steam-heated preheating oven for a time long enough to reach a substantially uniform temperature of 100° C., the molding process is not improved, but rather impaired. This method of heating lacks the necessary controllability.

It has now been found that a particularly satisfactory result in preheating thermosetting molding powders can be obtained by a process, wherein the mass is heated for a time sufficient to warm the mass throughout to a substantially uniform temperature which does not exceed 90° C. in the case of molding compositions containing phenol-formaldehyde resin binders, and which does not exceed 80° C. in the case of binders of the urea-formaldehyde resin class. The temperature has to be limited so that the fluidity of the powder does not deteriorate and the time of the preheating has to be adapted to the special requirements of the molding, governed by the time of the molding cycle, the quantity and disposition of the molding composition, its heat conductivity, and the structure and density of the components of the mass.

Electric heating provides facilities for accurate control of the temperature required for the preheating process. The maintenance of the heating elements and the connections between the elements and the control apparatus have hitherto caused some difficulty and the cost of the current consumed must also be considered.

According to my present invention the preheating method may be carried out by means of an electrically heated oven whose design overcomes the difficulties of inspection and maintenance of the electrical members and whose current consumption is negligible, and which can also be easily adapted to the necessary operating conditions, which vary with each individual task.

According to the present invention, an oven, suitably of rectangular section, has one vertical wall, the lower part of which is removably fixed to the oven and carries the control elements for the heating circuit, and also a member, situated horizontally in the lower part of the oven, which bears the heating elements, so that the lower portion of the front wall and the member bearing the heating elements form a unit which can easily be removed from the oven.

The control apparatus for the heating circuit, such as fuses, switches, pilot lamps and thermostat, may be placed on the removable part of the front wall. This arrangement allows withdrawal of the control apparatus and heating elements from the oven without interfering with the connecting wires. The wiring can be effected outside the oven, so as to be easily inspected, insulated and maintained. The wires connecting the heating elements and the control apparatus are preferably arranged in such a way that they are protected from outside influences.

In order to prevent loss of fluidity of the molding powder, it is essential to use a comparatively low temperature, but a mass possessing a poor heat conductivity will normally heat up only slowly. To overcome this difficulty, a number of charges of molding powder or pellets may be placed in the oven, and removed in sequence as required for the molding operation. As each preheated charge is removed, it may be replaced by a fresh charge. The number of charges in the oven at any time is governed by the time taken by each charge to acquire a substantially uniform temperature throughout, and by the number of molding operations to be carried out in that time. Assuming, for example, that the time required for the thorough preheating of a charge of pelleted molding powder is 30 minutes and that 30 molding operations are carried out per hour, the oven should contain 15 charges. For a cycle of 40 lifts per hour it should contain 20 charges.

Some powders, however, still tend to lose their fluidity on preheating, due to partial evaporation of their lubricants. This may be counteracted by placing in the preheating oven, at a suitable distance from the heating elements to prevent too rapid vaporization, but close enough to maintain a sufficient vapor pressure, a material whose vapor will be absorbed by the molding composition, and will maintain its fluidity. This may be effected, in the case of urea-formaldehyde resin compositions with water, and in the case of phenol-formaldehyde resin compositions with stearic acid.

To maintain an even temperature in the oven, it is necessary to limit as much as possible, the influx of cold air when a heated charge is withdrawn and fresh powder is placed in the oven. The occurrence of large temperature variations is particularly apparent with ovens closed by hinged doors, since each time the door is opened, a large area is open to the influx of cold air. To avoid this difficulty, the oven, according to a further feature of the invention, has one opening for each tray just large enough to take the tray with its load of powder or pellets. Each opening is closed by the front part of the tray, which is suitably constructed for this purpose. To reduce the time for which an opening is exposed when the heated load is withdrawn, one or several spare trays may be provided so that a tray loaded with fresh powder is ready for replacing the heated load. When it is desired to discontinue the preheating operations, trays bearing heated charge should be replaced by empty trays.

If pellets or powder fall in the interior of the oven on the hot surface of the heating elements, unpleasant fumes may be caused. To facilitate the removal of spilled powder or pellets and to keep them from falling onto the surface of the heating elements, a wire gauze may be inserted between the bottom row of the trays and the heating elements. The frame bearing the wire gauze may slide in guides fixed on the side walls of the oven. The front part of the frame is preferably fitted in the same manner as the front of the trays, but may be screwed, bolted or clamped to the front wall of the oven.

Figures 2, 3:
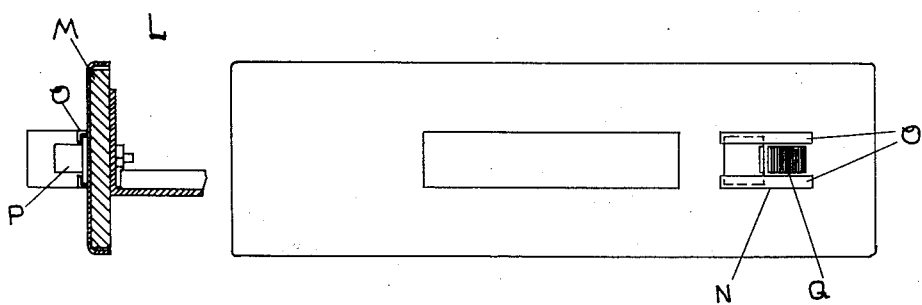
Figure 4:
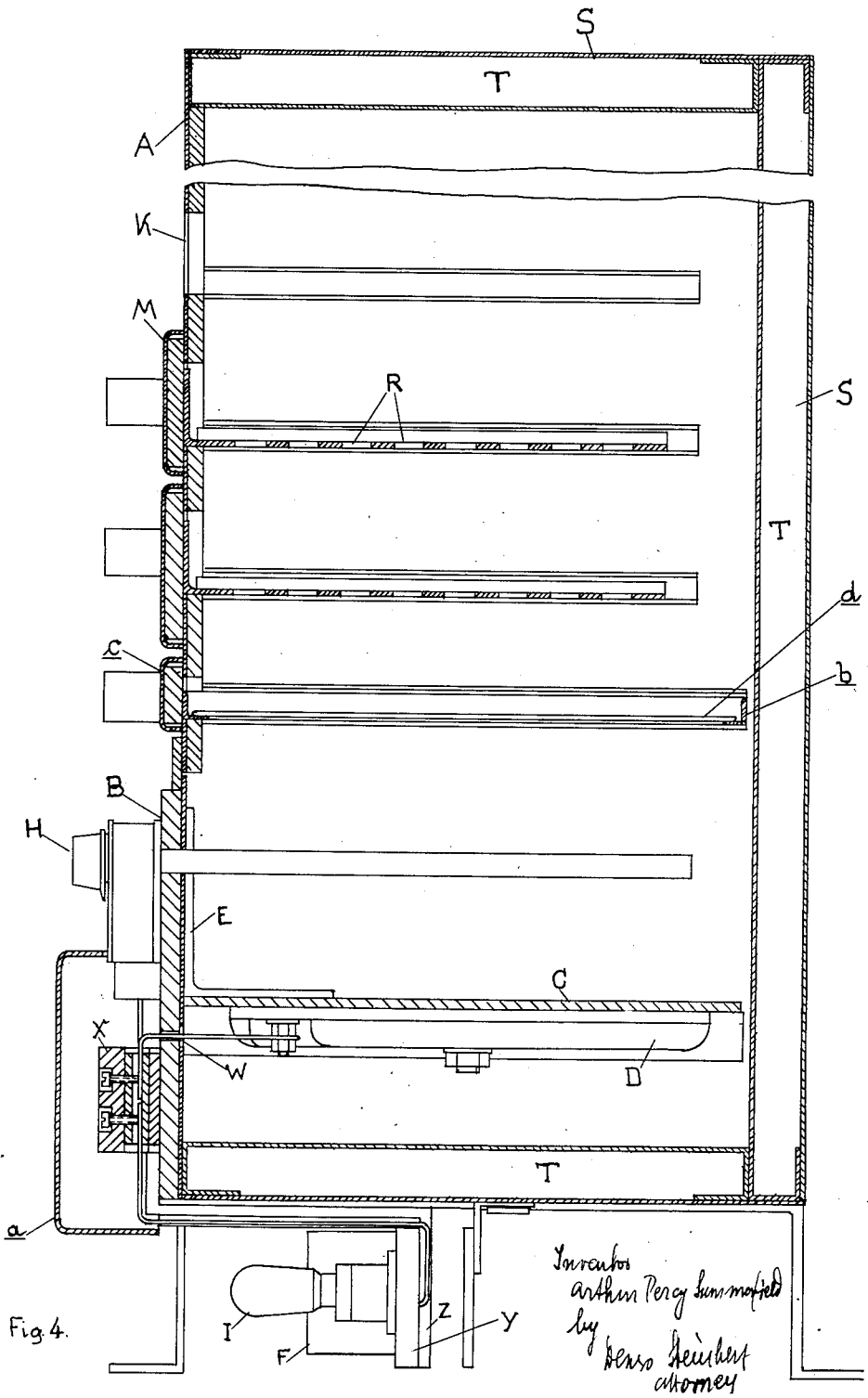

An apparatus for carrying out the invention is illustrated by way of example in the accompanying diagrammatic drawings, in which Fig. 1 shows a front view of the oven, on the right side of which the trays and a portion of the front wall are removed. Fig. 2 shows a front view of a tray with an indicator and Fig. 3 shows a side view of the front portion of a tray. Fig. 4 shows a transverse section of the oven.

The front wall of the oven consists of the upper part A and the lower removable panel B, the latter being connected with the platen C bearing the heating elements D by means of brackets E. The lower panel B supports the fuses F, the switches G, the thermostat H and the pilot lamps I. The wires connecting the heating elements and the apparatus F, G, H, I pass through holes W in the panel B to terminals X and thence pass to the control elements which are assembled on a board of insulating material Y, arranged on brackets Z so as to form a unit with the panels B and C. The terminals X and all the connections outside the oven with the exception of the main leads are protected by the cover $a$.

The upper part of the front wall is provided with a number of rectangular openings K, each of which admits a tray L having a portion M overlapping the openings K. An indicator N is fixed on the front part M of the trays L, consisting of two rails O between which slides an indicator P. When moved to the right the indicator P covers the mark Q. In this way the tray next to be removed may be marked.

The bottom of the trays is perforated by a number of holes R, or may be made of wire gauze having a mesh sufficiently small to prevent the molding charge from falling through. When the composition to be preheated is in the form of loose powder, it is preferably filled into small metal containers before being placed on the trays; the number of containers on one tray may correspond to the number of impressions of the mold. When the time of curing of the charge in the mold is so short that the time required to unload the trays into the mold may retard production, the trays may be arranged as loading boards for multiple impression molds. In this case the trays are provided with recesses corresponding in number and position to the impressions of the mold, which are closed at the bottom by a movable shutter. A tray may then be removed from the oven, placed on the mold, and emptied into the mold by sliding the shutter away from the bottom of the recesses, in a very short time.

The walls S of the oven, with the exception of the front wall, are hollow, and the interstices T are filled with an insulating material such as slack-wool or glass silk. The upper part A of the front wall is lined with a heat insulating material U and the bottom panel B consists also of a heat-resisting insulating material.

Between the bottom row of the trays L and the heating elements D a frame $b$, fitted with wire gauze netting $d$, and a metal front $c$, is supported on guides similar to those carrying the trays. The frame $b$ with the wire gauze $d$ is removable and can be withdrawn for the removal of spilled powder or pellets.

Due to the current of hot air rising from the heating element, between the edges of the trays and the walls of the oven, to the top thereof, the trays may not all reach the same temperature, even after a considerable time. The difference in temperatures of two parts of the oven may be as great as 10° C. In order to reduce or eliminate these differences, a forced draught may be maintained within the oven, for example by means of a fan, suitably arranged at the top or bottom of the oven.

Alternately to, or jointly with the forced draught, small shields may be placed on the side and rear walls of the oven so as to deflect the current of air into the spaces between the trays. These shields are preferably placed in staggered formation, so that a substantially equal proportion of the air current passes over the molding charge in each tray.

I claim:

1. An electrically heated oven for preheating moldable, thermosetting compositions, said oven including vertical walls; a portion of one of said vertical walls comprising a removable, heat-insulating panel; one side of said panel being provided with the thermostat and other electrical control members, and the other side of said panel being provided with a horizontal platen bearing the heating element; a portion of one vertical wall being provided with a number of apertures, adapted to receive slidably arranged trays, the front of said trays forming closures for said apertures, and the bottom of each tray consisting of wire gauze.

2. An electrically heated oven for preheating moldable, thermosetting compositions, said oven including vertical walls; a portion of one of said vertical walls comprising a removable, heat-insulating panel; one side of said panel being provided with the thermostat and other electrical control members, and the other side of said panel being provided with a horizontal platen bearing the heating element; a portion of one vertical wall being provided with a number of apertures, adapted to receive slidably arranged trays, the front of said trays forming closures for said apertures, each tray being provided with a number of unperforated containers.

3. An electrically heated oven for preheating moldable, thermosetting compositions, said oven including vertical walls; a portion of one of said vertical walls comprising a removable, heat-insulating panel; one side of said panel being provided with the thermostat and other electrical control members, and the other side of said panel being provided with a horizontal platen bearing the heating element; a portion of one vertical wall being provided with a number of apertures, adapted to receive slidably arranged trays, the front of said trays forming closures for said apertures, the bottom of each tray being provided with a number of recesses provided with slidably removable bottom portions.

4. An electrically heated oven for preheating moldable, thermosetting compositions, said oven including vertical walls; a portion of one of said vertical walls comprising a removable, heat-insulating panel; one side of said panel being provided with the thermostat and other electrical control members, and the other side of said panel being provided with a horizontal platen bearing the heating element; a portion of one vertical wall being provided with a number of apertures, adapted to receive slidably arranged trays, the front of said trays forming closures for said apertures, the front of each tray being provided with an indicator comprising a plate slidable between guides.

5. An electrically heated oven for preheating moldable, thermosetting compositions, said oven including vertical walls; a portion of one of said vertical walls comprising a removable, heat-insulating panel; one side of said panel being provided with the thermostat and other electrical control members, and the other side of said panel being provided with a horizontal platen bearing the heating element; a portion of one vertical wall being provided with a number of apertures, adapted to receive slidably arranged trays, the front of said trays forming closures for said apertures, a removable frame bearing a wire gauze netting being interposed between each vertical tier of trays and the electrical heating element.

ARTHUR PERCY SUMMERFIELD.